(12) United States Patent
Rinderer

(10) Patent No.: US 8,496,211 B2
(45) Date of Patent: Jul. 30, 2013

(54) SELF-CORRECTING CONDUCTOR POSITIONING BRACKET

(75) Inventor: Eric Rinderer, Nashville, TN (US)

(73) Assignee: ERICO International Corporation, Solon, OH (US)

( * ) Notice: Subject to any disclaimer, the term of this patent is extended or adjusted under 35 U.S.C. 154(b) by 662 days.

(21) Appl. No.: 12/364,212

(22) Filed: Feb. 2, 2009

(65) Prior Publication Data
US 2010/0282939 A1 Nov. 11, 2010

Related U.S. Application Data

(60) Provisional application No. 61/026,441, filed on Feb. 5, 2008.

(51) Int. Cl.
*F16L 3/08* (2006.01)

(52) U.S. Cl.
USPC ............... 248/65; 248/71; 248/73; 248/300; 248/68.1

(58) Field of Classification Search
USPC ............. 248/300, 58, 70, 65, 73, 74.1, 906, 248/68.1; 174/481, 65 R; 220/3.9, 3.3, 3.4; 138/106
See application file for complete search history.

(56) References Cited

U.S. PATENT DOCUMENTS

| 4,907,766 | A | * | 3/1990 | Rinderer | 248/57 |
|---|---|---|---|---|---|
| 4,943,022 | A | | 7/1990 | Rinderer | |
| 4,964,525 | A | * | 10/1990 | Coffey et al. | 220/3.9 |
| 4,967,990 | A | | 11/1990 | Rinderer | |
| 5,005,792 | A | | 4/1991 | Rinderer | |
| 5,060,891 | A | * | 10/1991 | Nagy et al. | 248/56 |
| 5,141,185 | A | | 8/1992 | Rumbold et al. | |
| 5,263,676 | A | * | 11/1993 | Medlin et al. | 248/300 |
| 5,330,137 | A | | 7/1994 | Oliva | |
| 5,587,555 | A | | 12/1996 | Rinderer | |
| 5,595,362 | A | | 1/1997 | Rinderer | |
| 6,572,058 | B1 | | 6/2003 | Gerrardo | |
| 6,666,419 | B1 | | 12/2003 | Vrame | |
| 6,996,943 | B2 | | 2/2006 | Denier et al. | |
| 7,014,152 | B2 | * | 3/2006 | Grendahl | 248/49 |
| 7,472,875 | B2 | * | 1/2009 | Rinderer | 248/200.1 |
| 8,042,776 | B2 | * | 10/2011 | Johnson | 248/200.1 |
| 8,403,289 | B1 | * | 3/2013 | Rinderer | 174/480 |

* cited by examiner

Primary Examiner — Todd M. Epps
(74) Attorney, Agent, or Firm — Waddey & Patterson, P.C.; Phillip E. Walker; Gary L. Montle

(57) ABSTRACT

The invention relates generally to a bracket adaptable to mount upon a wall stud and resist displacement of the bracket in response to external forces, thereby maintaining one or more securely enclosed conductors at least a fixed distance from an installed sheet of drywall. A mounting portion is shaped to permit fastening to a wall stud. A lateral support portion is attached to the mounting portion and at an angle relative to the mounting portion such that upon fastening of the bracket to the wall stud an edge of the lateral support portion engages the wall stud and resists displacement of the bracket. The lateral support portion includes an aperture wherein the conductors may be placed such that they extend substantially parallel to the plane of the wall stud, and are also thereby positioned at least a fixed distance from the plane of the sheet of drywall.

26 Claims, 8 Drawing Sheets

SELF-CORRECTING CONDUCTOR POSITIONING BRACKET

CROSS-REFERENCES TO RELATED APPLICATIONS

This application claims benefit of the following patent application which is hereby incorporated by reference: U.S. Provisional Patent Application No. 61/026,441 filed Feb. 5, 2008.

BACKGROUND OF THE INVENTION

The present invention relates generally to a device for maintaining conductors within the interior cavity of a wall a certain distance from a wall surface parallel to the attachment surface of a wall stud. More particularly, the invention is directed toward a rigid and self-correcting bracket that assures the conductors are maintained a certain distance from a wall surface even if the conductor positioning brackets are unintentionally contacted by a worker or other individual after the conductors have been correctly installed.

In most construction of buildings and homes, wall surfaces are typically composed of gypsum wall board, also known as drywall. To construct these wall surfaces, support members, typically known as wall studs, are vertically mounted and secured in the structure to define a frame for the wall and conductors, such as electrical wiring, are then mounted within the frame. Power operated tools are then generally utilized to secure the drywall to the studs using screws, nails, or other fasteners.

Unfortunately, construction workers often misjudge the location of these studs. As the power operated tools are capable of rapid and forceful driving of fasteners, and the studs are located behind the drywall, such a misjudgment can potentially damage conductors during the installation process. Consequently, conductors must be kept a safe distance from the drywall to assure that these conductors will not be damaged by an inadvertently inserted fastener. The same reasoning extends to lay persons who seek merely to decorate a completed room by hanging pictures, clocks, lighting fixtures, or other items. Since the electrical conductors and studs are hidden from view, the decorator runs a risk of severe electrical shock and creating a fire hazard.

For these reasons, the National Electric Code (NEC) and many local building codes require that all conductors be placed at least 1¼" behind the wall. Even if such codes do not apply, it would still be prudent to take steps to avoid the risks inherent in failing to maintain conductors a safe distance behind the wall at all times. Furthermore, the brackets disclosed in the prior art are insufficient to ensure the code is adequately met to the extent they do not address the problems that arise when the conductors are somehow displaced away from one wall to the point that they are subsequently less than 1¼" from either wall surface.

What is needed then is a device that can correct or prevent an unintentional bending or displacement of the bracket to assure that the conductor is maintained in a fixed position at least 1¼" from the wall surface after securement of the drywall.

BRIEF SUMMARY OF THE INVENTION

The present invention provides a self-correcting conductor positioning device that is shaped or otherwise configured to maintain one or more conductors at least a fixed distance from a first wall surface despite any unintentional bumps, twists or other forces that may tend to displace the device or the conductor positions.

The conductor positioning device is shaped or otherwise configured to secure the one or more conductors substantially in a fixed position such that they maintain a proper distance from a first or second wall surface despite any unintentional bumps, twists or other forces that may tend to displace the device or the conductor positions.

The conductor positioning device securely positions and encloses the one or more conductors such that the conductors are prevented from coming loose over time and thereby potentially violating codes or creating a risk of electrical shock or fire hazard.

In accordance with the aforementioned statements, an embodiment of the device is a bracket provided to be mounted on a vertical support member or wall stud and secure one or more conductors a fixed distance from the drywall surface which will be attached to the support member. The basic components of the device are a mounting portion that is positionable so that the bracket can be mounted on the support member and a lateral support portion that extends laterally from the support member and that is generally angular to the mounting portion. The mounting portion may be positioned so that it can be mounted on the front surface of the laterally extending portions of the support member or it may be positioned so that the bracket can be mounted on a side surface of the support member. In this manner the bracket may also be mounted on a wooden stud. Alternatively, the device may comprise a plurality of mounting portions that are flexible to accommodate any configuration of support members.

Embodiments of the device further may comprise a tab attached to the mounting portion and abutting the wall stud coincident to the surface at which the lateral portion does the same, thereby further preventing displacement of the bracket by upward, downward, and front-to-rear lateral forces.

The bracket has a securement aperture comprising a mouth and an elongated enclosure shaped to receive at least one conductor. The one or more conductors are maintained at least 1¼" from the front edge of the lateral portion, which prevents fasteners from making contact with the conductors during the securement of the drywall to the studs. This feature further permits the device to self-correct any unintentional bending of the bracket outwardly from the support member. In the scenario where the device is bent forward, the front edge of the lateral support portion will extend in front of the front surface of the support member. In this manner, the drywall will engage the over-extended front edge of the lateral support portion when the drywall is being secured to the support member. This will bend the bracket back into its appropriate position and assure that the conductors are at least 1¼" from the front surface.

Embodiments of the bracket further may comprise means for securing the one or more conductors within the elongated enclosure. A retaining member or tab forms one side of the elongated enclosure and is flexible to both bend out and permit entry of the one or more conductors and bend in to enclose and secure the one or more conductors. A flexible closing member or tab is attached to the lateral support portion and extends across the mouth of the elongated enclosure. The retaining member has a hole corresponding to the position of the closing member when it is perpendicular to the lateral support portion so as to accommodate the closing member and prevent it from flexing out, thereby further securing the conductors. Likewise, the closing member may further bend around the hole of the retaining member and prevent it from flexing out, thereby further securing the conductors.

DETAILED DESCRIPTION OF THE INVENTION

Figure 1:
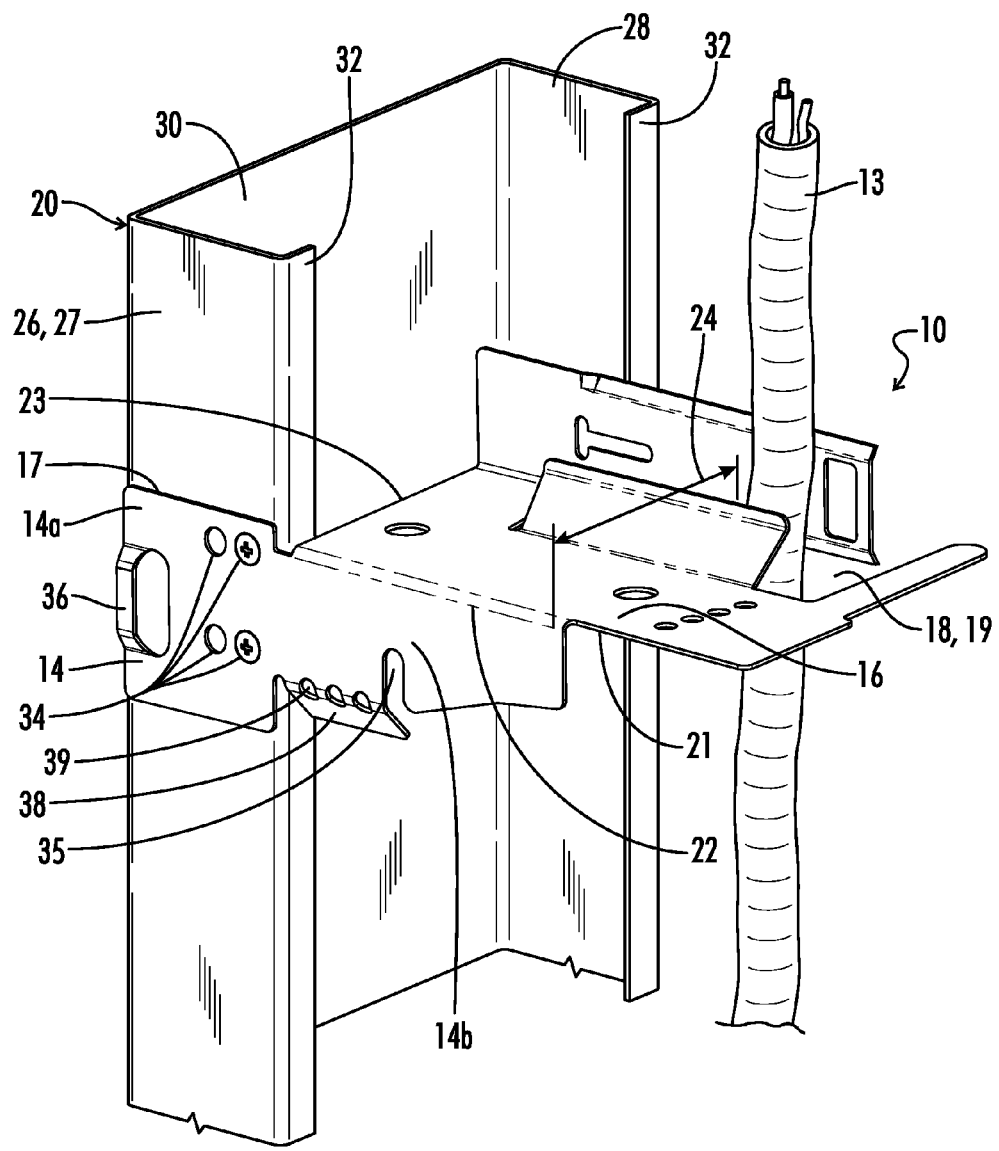
FIG. 1 is a perspective view of an embodiment of the present invention mounted on a vertical support member with return flanges.

The present invention relates generally to various embodiments of a conductor positioning device 10, 11, 12 and more specifically to a rigid and self-correcting conductor positioning bracket 10, 11, 12 that firmly secures one or more conductors 13 a predetermined fixed distance from an inward facing wall surface while additionally preventing displacement or bending of the bracket 10, 11, 12 due to unintentional external forces.

Referring generally to embodiments of the invention as shown in FIGS. 1-6, a device 10 or more particularly a bracket 10 generally comprises a mounting member 14 or mounting portion 14 and a lateral member 16 or lateral support portion 16. The lateral support portion further includes an aperture 18 shaped as a recess 18 or elongated passage 18. The aperture 18 further comprises a mouth 19 through which the conductors 13 may pass into the aperture 18 and be secured therein. At least a first section 14a of the mounting portion 14 is substantially planar, and further shaped so as to permit fastening of the bracket 10 to a support member 20. The lateral support portion 16 is also substantially planar in shape and attached at an angle relative to the first section 14a of the mounting portion 14, such that the aperture 18 remains at all times at least a fixed predetermined distance 24 from the plane of the first section of the mounting portion 14. More particularly, for the purposes of this application the fixed distance 24 from the aperture 18 to the plane of the first section 14a of the mounting portion 14 simultaneously refers to a fixed distance 24 from the one or more conductors 13 to the plane of the first section 14a of the mounting portion 14.

The one or more conductors 13 will thereby in the described embodiments extend roughly perpendicular to the plane of the lateral support portion 16 and roughly parallel to the longitudinal axis of the support member 20.

The bracket 10 of the present invention is intended to be mounted upon a support member 20 onto which drywall for example will be fastened. For the sake of clarity the invention will hereafter be described with reference to a vertical support member 20 with a horizontal plane of reference being generally perpendicular to the vertical axis of the support member 20. The "front" of the bracket 10 or of the support member 20 will be referred to as comprising the portions of the bracket 10 or support member 20 facing the drywall. Lateral forces acting upon the bracket 10 may thereby be referred to as "back to front" or "front to back" with respect to the support member 20 upon which the bracket 10 is mounted. "Vertical" is further defined as substantially parallel with the longitudinal axis of the support member 20 and "lateral" is defined as having a generally transverse spatial relationship with the longitudinal axis. "Upward" and "downward" forces acting upon the bracket 10 may similarly be understood without further elaboration. The lateral support portion 16 generally comprises first, second, third and fourth sides that may be referred to either numerically or as front, outwardly facing, rear or inwardly facing sides, respectively. These definitions are intended merely for clarity and are in no way limiting upon the functionality of the invention, as it will be seen that the bracket 10 may be mounted in various alternative and equivalent fashions.

The support member 20 as shown in the drawings and herein described is a metal wall stud 20 as conventional in the industry. The wall stud 20 further comprises a front flange 26, a rear flange 28 and an orthogonal interconnecting side 30. The front flange 26 for the purposes of this description further comprises a front wall attachment surface 27 upon which the drywall may be fastened. Many configurations of wall studs 20 will further comprise return flanges 32 extending inward from the end of both the front and rear flanges 26, 28. Where return flanges 32 are not available the front flange further comprises a flange edge 29. In other cases the wall stud 20 may otherwise be comprised of wood. However, the various embodiments disclosed herein will comprise sufficient features permitting attachment of the brackets 10, 11, 12 to each of the various alternative configurations of wall studs 20.

Referring now to FIG. 1, an embodiment of the conductor positioning device 10 will presently be described. The design of the bracket 10 substantially prevents displacement as a result of unintended external forces and ensures that the fixed distance 24 from the conductors to the drywall is maintained once the wall is complete. To that end, the mounting portion 14 is shaped such that a first section 14a of the mounting portion 14 overlaps at least part of the front flange 26 and front wall attachment surface 27 of the wall stud 20. One or more fastener holes 34 are defined within the face of the first section 14a of the mounting portion 14 through which fastening means such as one or more screws or other equivalents may be used to fasten the mounting portion 14 to the wall stud 20. In some embodiments, the mounting portion 14 also comprises open slots 35 into which such fastening means may be slidably received.

Figure 3:
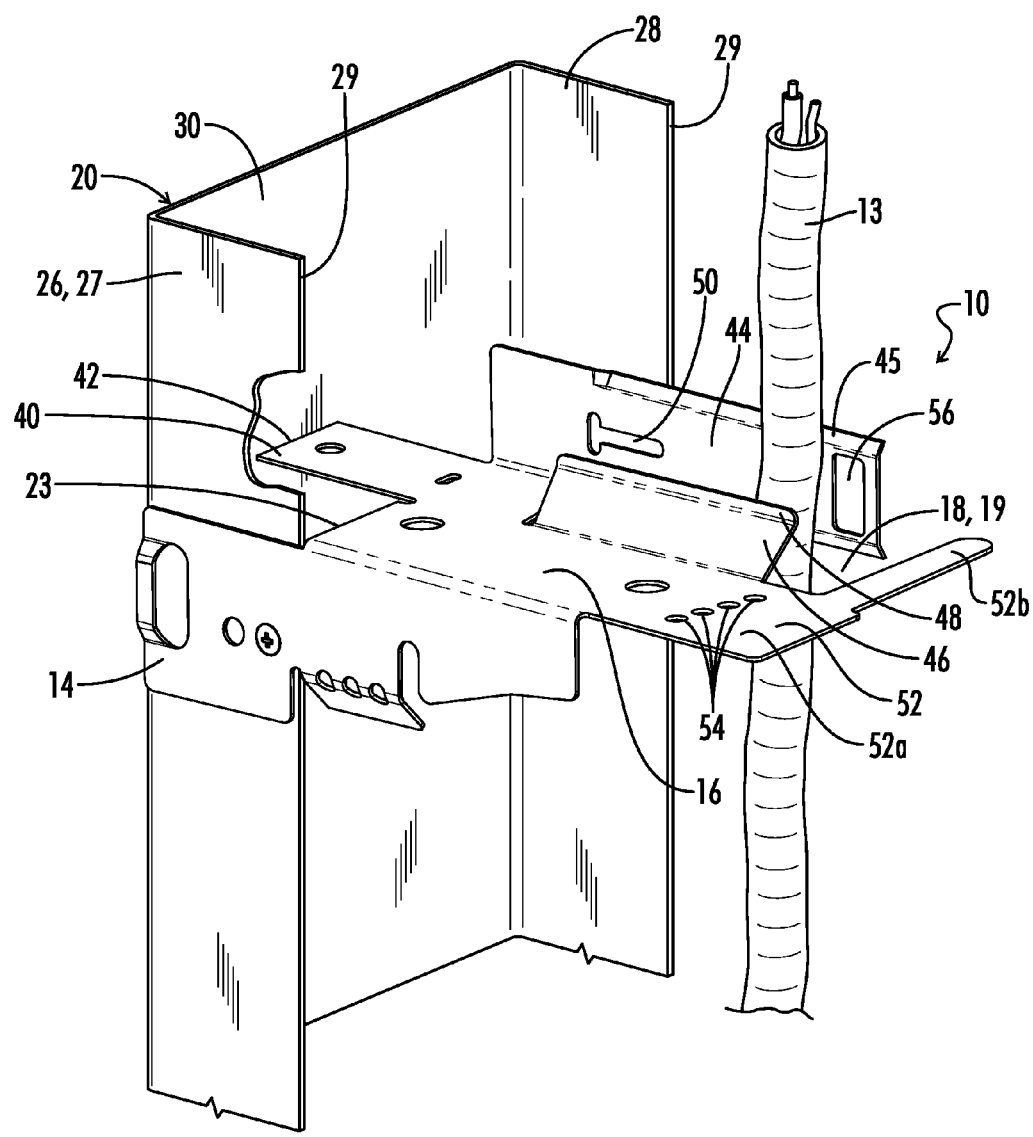
FIG. 3 is a perspective view of an embodiment of the present invention mounted on a vertical support member without return flanges.

In an embodiment of the invention such as that shown in FIG. 1 a top side 17 of the first section 14a of the mounting portion 14 extends vertically above the top side of a second section 14b of the mounting portion 14 further comprising the first edge 22 or front edge 22 of the bracket 10. In other embodiments such as shown in FIG. 3 for example, the top side 17 of the mounting portion 14 is linearly composed in its entirety. In either configuration, parts of the mounting portion 14 and lateral support portion 16 generally will continuously engage at least part of the wall stud 20 on two sides, such that where the front flange 26 ends the lateral support portion 16 may be flush with and abutting at least part of the wall stud 20 as well.

In an embodiment as shown in FIG. 1, the lateral support portion 16 has a first side 21 or front side 21, part of which comprises the front edge 22 as defined above. The front side 21 is substantially linear and generally extends continuously and laterally along an axis comprising the front edge 22. The lateral support portion 16 further is positioned perpendicular to the mounting portion 14 and the longitudinal axis of the wall stud 20.

Figure 2:
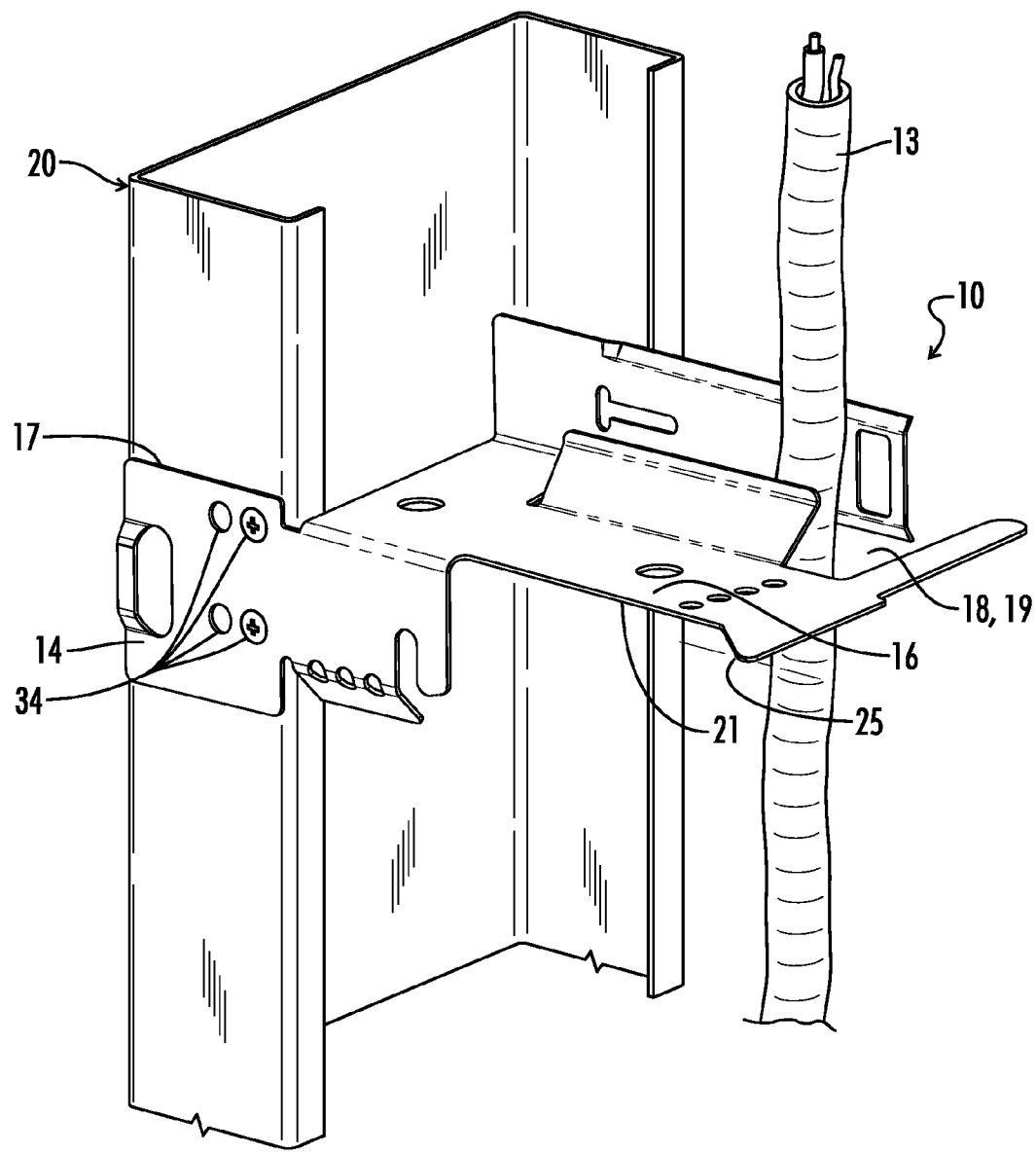
FIG. 2 is a perspective view of another embodiment of the present invention mounted on a vertical support member with return flanges.

It may be anticipated that in alternative embodiments such as shown in FIG. 2, the front side 21 is non-linear or otherwise delineates from the vertical axis comprising the front edge 22. If the lateral support portion 16 does not comprise a continuous front side 21, at least part of the front side 21 of the lateral support portion 16 will nevertheless preferably form an alternative edge 25 coincident with the plane of the first section 14a of the mounting portion 14 to permit the self-correcting feature described below.

It may be further anticipated that in alternative embodiments not shown herein, the lateral support portion 16 will comprise a surface either attached coincident with the plane of the first section 14a of the mounting portion 14, or flexible to such a position where desired.

Returning to FIG. 1, to ensure proper positioning of the lateral support portion 16, an embodiment of the mounting portion 14 further comprises a user support tab 36 or thumb tab 36. The thumb tab 36 extends slightly outward from the first section 14a of the mounting portion 14 in a vertically oriented U-configuration to facilitate a user holding the bracket 10 firmly in place by applying a lateral force to the thumb tab 36. The user may thereby pull a second edge 23 or inwardly facing edge 23 of the lateral support portion 16 tight against the front flange 26 of the wall stud 20, either engaging the return flange 32 where available or otherwise the flange edge 29. The user may then fasten the bracket 10 to the wall stud 20 in the preferred position. Preferably, the thumb tab 36 is positioned distal from the second section 14b of the mounting portion 14.

When the bracket 10 is secured to the wall stud 20 in this fashion, the device 10 is prepared to resist external forces and prevent displacement from its present position. In the event that the wall stud 20 comprises return flanges 32 or side flanges 32 as may be understood by those of ordinary knowledge in the industry, the previously disclosed features alone will generally resist such movement. The combination of the mounting portion 14 being securely fastened to the front flange 26 and the second edge 23 of the lateral support portion 16 being flush against the return flange 32 of the wall stud 20 substantially counters foreseeable external forces and thereby substantially resists displacement or bending of the bracket 10. This is particularly true in light of the resilient tendencies of most standard metal wall studs 20 and wall stud flanges and the inherent rigidity of the bracket 10 as designed.

Referring again to FIG. 1, the location of the one or more fastener holes 34 by which the mounting portion 14 is fastened to the wall stud 20 is significant. For optimal resistance to external forces in a bracket 10 of the embodiment above described, the fastener holes 34 will be located along the axis of the first edge 22 of the bracket 10. While alternative configurations are anticipated, additional features of the bracket 10 such as described hereafter will be relied upon to optimize resistance to external forces and prevention of displacement of the bracket 10 for those configurations.

Still referring to FIG. 1, an embodiment of the bracket 10 further comprises an improved self-correcting feature in the event that the bracket 10 is displaced or bent in response to a back-to-front force. Such a force generally bends the bracket 10 about the longitudinal axis in which the bracket 10 is fastened to the wall stud 20, and subsequent fastening of the drywall to the wall stud 20 will push the bracket 10 back into place about that same longitudinal axis. Further, in the embodiment shown the front side 21 of the lateral support portion 16 extends laterally and continuously beyond the front edge 22 shared with the mounting portion 14. In other embodiments such as shown in FIG. 2 it is anticipated that the front side 21 may not be continuous, or some alternative extension of or from the lateral support portion 16 may otherwise approach the axis comprising the front edge 22 and comprise an alternative surface or front edge 25 that correspondingly engages the drywall. In either case, some surface or edge of the bracket 10 thereby contacts the drywall or crosses the plane in which the drywall must be positioned in the event there is lateral displacement in this direction, and the bracket 10 will therefore be repositioned by the drywall during routine and proper installation. In this manner the fixed distance 24 will be maintained from one or more conductors within the aperture 18 to the plane of the first section 14a of the mounting portion 14, and by extension from the conductors within the aperture 18 to the drywall.

While the previously disclosed features of the present invention are innovative and reliably counter significant foreseeable external forces so as to maintain conductors 13 a fixed distance 24 from the drywall, additional features are hereafter presented to further achieve the purposes of the device 10.

Still referring to FIG. 1, an embodiment of the bracket 10 further comprises a stabilizing tab 38 extending from the bottom of the second section 14b of the mounting portion 14. This stabilizing tab 38 may extend parallel to the plane of the mounting portion 14, but generally will be flexed about a horizontal axis generally comprising an axis of attachment to the mounting portion 14 and extend generally inward toward the lateral support portion 16. In an embodiment, this axis is further defined by a plurality of apertures 39 wherein the user may more easily move the stabilizing tab 38 back and forth from the flexed position to the position parallel to the plane of the mounting portion 14. In wall stud embodiments having return flanges 32 the stabilizing tab 38 is intended to provide significant further resistance to downward or lateral front-to-rear forces. Therefore the stabilizing tab 38 will preferably be shaped and positioned such that the tab 38 substantially engages the return flange 32 along its entire length. In some embodiments the stabilizing tab 38 and the lateral support portion 16 will have coincident sides that abut and engage the return flange 32.

The stabilizing tab 38 can perform similarly in the event the bracket 10 is mounted to the side 30 of a wall stud 20 in an inverted configuration wherein the second edge 23 of the bracket 10 is substantially coincident with and abuts the side 30 of the wall stud 20. The stabilizing tab 38 and the side of the lateral support portion 16 will remain coincident to the side 30 of the wall stud 20 and act to prevent displacement thereby.

For optimal resistance to external forces, the one or more fastener holes 34 by which the mounting portion 14 of this embodiment is fastened to the wall stud 20 preferably are positioned generally above the axis about which the stabilizing tab 38 flexes inward from the plane of the mounting portion 14. Additionally, the fastener holes 34 can be preferably positioned generally below the horizontal axis comprising the front edge 22 of the bracket 10. Alternative configurations of the mounting portion 14 and locations for the one or more holes 34 are possible, but do not offer universal resistance to all configurations of wall studs 20 with the same effect as the above described embodiment.

Figure 7:
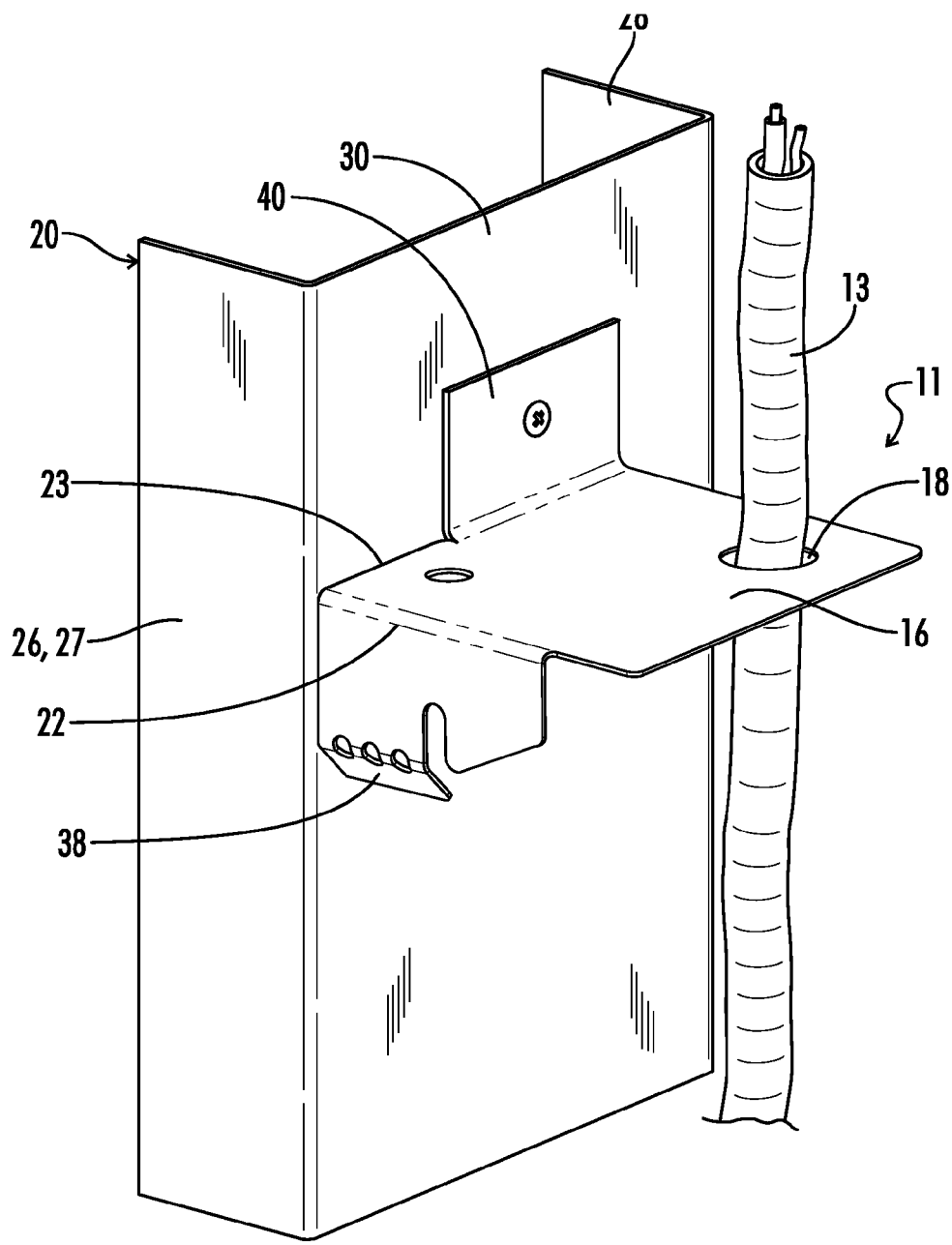
FIG. 7 is a perspective view of another embodiment of the present invention attached to the opposing side of the support member.

Referring now to FIG. 3, an embodiment of the bracket 10 of the present invention is disclosed for substantially resisting displacement of the bracket 10 when mounted upon a wall stud 20 having front and rear flanges 26, 28 but lacking return flanges. The bracket 10 of this embodiment further comprises a second mounting portion 40 attached to the second side of the lateral support portion 16 facing the wall stud 20 and generally comprising the second edge 23. The second mounting portion 40 in this embodiment is substantially planar, but in alternative embodiments may extend at an angle relative to the lateral support portion 16. The attachment between the second mounting portion 40 and the lateral support portion 16 further comprises an axis about which the second mounting portion 40 may be flexed by the user to a desired position.

Where the bracket 10 is to be mounted to a wall stud 20 having the configuration of FIG. 3, the second mounting portion 40 can be preferably positioned parallel to the lateral support portion 16, the second mounting portion 40 shaped such that an edge 42 of the second mounting portion 40 engages the side 30 of the wall stud 20. In this manner the bracket 10 is securely wedged against the wall stud 20 and substantially resists displacement or bending by external forces. It will be understood that this embodiment could also be utilized to provide additional support where return flanges 32 are present.

Where the bracket 10 is to be mounted to a wall stud 20 having an alternative inverted configuration as shown for example in FIG. 7, the second mounting portion 40 can be positioned perpendicular to the lateral support portion 16, the second mounting portion 40 adaptable to permit fastening of the second mounting portion 40 to the wall stud 20. Embodiments of the invention having a second mounting portion 40 therefore increase the flexibility of the bracket 10 to securely mount on any configuration of wall stud 20 and reliably resist displacement.

Referring generally now to FIGS. 1-3, the means by which various embodiments of the bracket 10 secure the conductors 13 will now be described. The lateral support portion 16 further comprises a vertical retaining portion 44 or retaining member 44 positioned along the rear side of the lateral support portion 16 and bent upward and generally transverse to the plane of the horizontal portion of the lateral support portion 16. In alternative embodiments the lateral support portion 16 and the retaining member 44 may comprise separate components attached perpendicular along the rear side of the lateral support portion 16. Together the vertical retaining member 44 and the lateral support portion 16 define the contours of the aperture 18 or elongated enclosure 18. The side of the elongated enclosure 18 defined by the retaining member 44 and the opposing side of the elongated enclosure 18 defined by the lateral support portion 16 are substantially linear in shape and parallel to each other. The mouth 19 of the elongated enclosure 18 is further defined within the outward facing side of the lateral support portion 16. The retaining member 44 further comprises a first section proximate the attachment to the lateral support portion 16 and a second section comprising the remainder of the retaining member 44. The second section further includes a terminal end 45 of the retaining member 44 proximate the mouth 19 of the elongated enclosure 18 and the outward facing side of the lateral support portion 16.

In certain embodiments as shown in FIG. 1-3 a positioning member 46 is further attached to the lateral support portion 16 along at least a portion of the side of the elongated enclosure 18 defined by the lateral support portion 16. The positioning member 46 extends at an angle upward and generally toward the retaining member 44. In alternative embodiments it is anticipated that the positioning member 46 may instead extend vertically from and perpendicular to the lateral support portion 16. The positioning member 46 has a contact portion 48 opposite the attachment to the lateral support portion 16. A bracket 10 corresponding to these embodiments is shaped such that the contact portion 48 at all points is at least the fixed distance 24 from the front edge 22 of the bracket 10. The contact portion 48 engages the one or more conductors 13 when they are placed into the elongated enclosure 18 and thereby prevents the one or more conductors 13 from being positioned less than the fixed distance 24 from the plane of the first section 14*a* of the mounting portion 14.

The contact portion 48 further extends upward relative to the remainder of the positioning member 46 to a position transverse to the plane of the lateral support portion 16, such that the one or more conductors 13 and the contact edge 48 extend generally parallel to each other. This configuration provides a superior engagement with the one or more conductors 13 and facilitates the conductors 13 remaining not only the fixed distance 24 from the plane of the first section 14*a* of the mounting portion 14 of the bracket 10 but also at an angle generally parallel to the longitudinal axis of the support member 20 at all times as well.

It should be noted that because of current building code standards such as those of the NEC, this fixed distance 24 is typically at least 1¼". However, the bracket 10 may be utilized to maintain the one or more conductors 13 any desired fixed distance 24 from the plane of the first section 14*a* of the mounting portion 14 and by extension from the plane of the front wall attachment surface 27. For example, additional distance from the drywall may be desirable or prudent under specific circumstances that may be foreseeable by the end user.

Returning generally to FIGS. 1-3, in certain embodiments as shown the second section of the retaining member 44 is adaptable so as to bend or flex about a plurality of axes transverse to the lateral support portion 16. This permits the retaining member 44 to bend around and behind the one or more conductors 13 and thereby secure the conductors 13. The retaining member 44 further comprises a first elongated aperture 50 of a generally horizontal orientation, the first elongated aperture 50 preferably positioned in the second section of the retaining member 44 generally proximate to the second section of the retaining member 44 and to an end of the elongated enclosure 18 distal from the mouth 19. This location substantially enhances flexibility of the second section of the retaining member 44 along the length of and proximate to the first elongated aperture 50 such that the retaining member 44 may more effectively bend about and secure a single conductor 13 for example. The second section of the retaining member 44 does further retain a somewhat lesser degree of flexibility along the remainder of its length and about a plurality of longitudinal axes generally parallel to the longitudinal axis of the wall stud 20. The particular axis or axes are selected so as to bend around conductors 13 of various sizes and quantities rather than maintain a substantially straight configuration from a single axis to the end 45 of the retaining member 44. In this manner for example the one or more conductors 13 may be more tightly and effectively secured than is otherwise possible.

Embodiments as displayed in FIGS. 1-3 of the bracket 10 may further comprise a closing member 52 attached to the lateral support portion 16 and extending generally across the mouth 19 of the elongated enclosure 18. The closing member 52 substantially comprises a first section 52a and a second section 52b. The first section 52a comprises the attachment of the closing member 52 to the lateral support portion 16, the attachment further defining an axis about which the closing member 52 may be bent or flexed from a position parallel to the lateral support portion 16 to a position perpendicular to the lateral support portion 16. In the embodiments displayed in FIGS. 1-3, this axis is further defined by a plurality of apertures 54 wherein the user may more easily flex the closing member 52 as desired. The second section 52b of the closing member 52 is substantially flexible along its length and about a plurality of axes generally perpendicular to the axis of attachment to the lateral support portion 16.

Referring generally now to FIGS. 1-4a to further describe how the described embodiments function to effectively enclose the conductors 13, the closing member 52 is initially straight as shown in FIGS. 1, 2, 3 and 4. The retaining member 44 can then be flexed back so that the elongated enclosure 18 can receive one or more conductors 13. As further demonstrated in FIG. 4a, once the conductors 13 are received within the elongated enclosure 18 the closing member 52 may be bent into the position perpendicular to the lateral support portion 16. The retaining member 44 in the described embodiments further comprises a second elongated aperture 56 vertically oriented proximate the end 45 of the retaining member 44. Subsequently, the retaining member 44 may be flexed forward and the closing member 52 inserted into the second elongated aperture 56.

Figure 4:
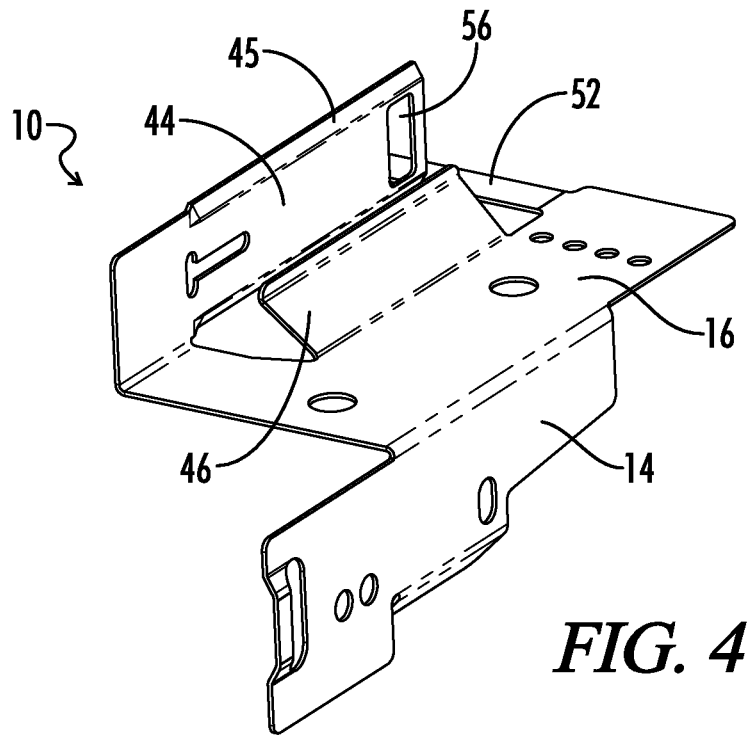
FIG. 4 is an inverted perspective view of an embodiment of the present invention with the closing member in an open parallel position.
Figure 4A:
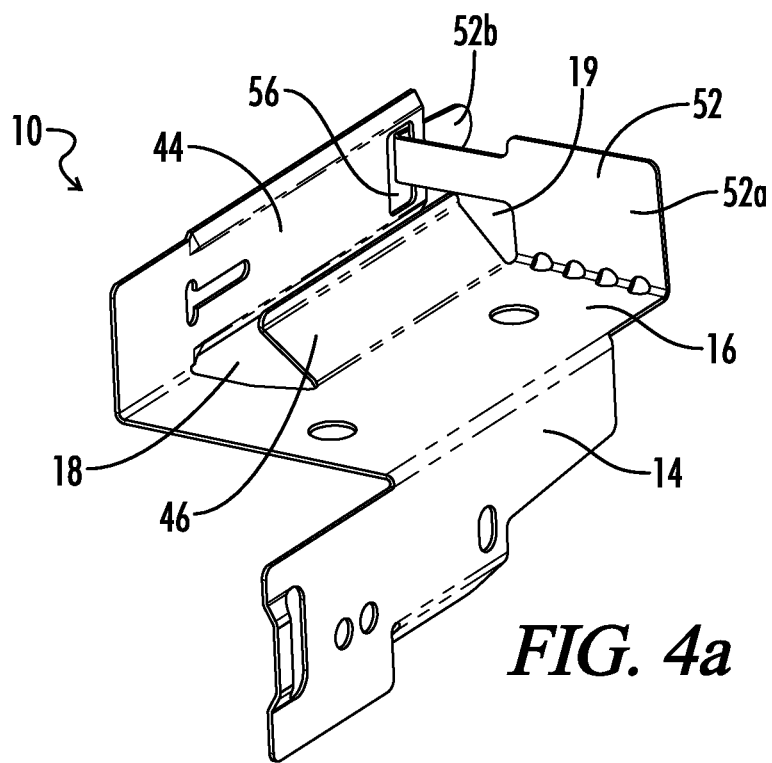
FIG. 4a is an inverted perspective view of the embodiment of FIG. 4 with the closing member in a closed perpendicular position.

Again as demonstrated in FIG. 4a, the second section 52b of the closing member 52 as previously described is further flexible so as to permit bending as desired by the user about the end 45 of the retaining member 44. In this manner the closing member 52 may be flexed or bent fully around the second elongated aperture 56 of the retaining member 44 to assure that the retaining member 44 can no longer be pulled back, thereby effectively securing the conductors 13 within the elongated enclosure 18. Ideally the closing member 52 is sufficiently adaptable to flex about the end 45 of the retaining member 44 at any desired portion of the second section 52b of the closing member 52 depending upon the quantity or size of the one or more conductors 13 that may be positioned within the elongated enclosure 18.

Figure 5:
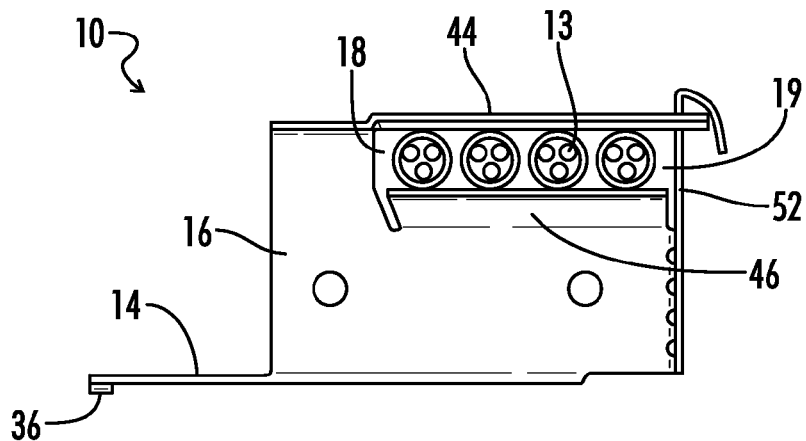
FIG. 5 is a top view of an embodiment of the present invention.
Figure 6:
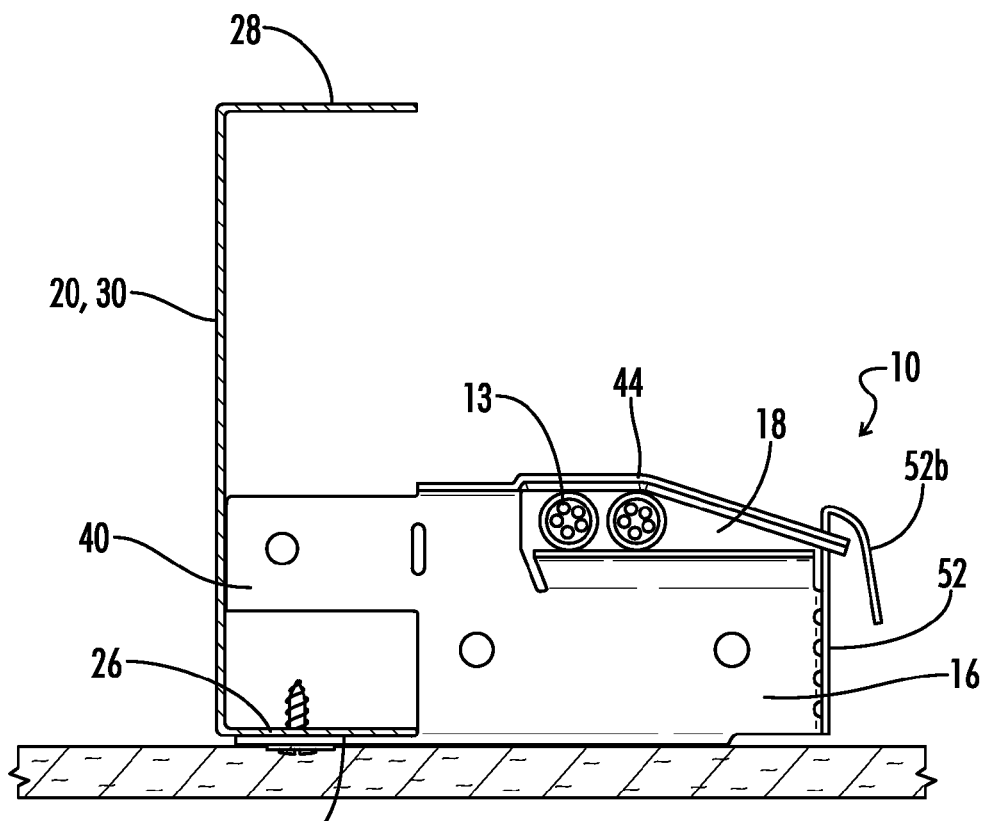
FIG. 6 is a top view of an embodiment of the present invention.

FIGS. 5-6 further serve to illustrate these features. FIG. 5 shows the bracket 10 holding four (4) electrical conductors 13. However, the elongated enclosure 18 may be too long if fewer conductors 13 are held in the enclosure 18. Only two (2) conductors 13 are being held by the bracket 10 in FIG. 6. To secure the conductors 13 so that they do not slide within the elongated enclosure 18, the retaining member 44 may be bent forward to shorten the length of the enclosure 18 as shown in FIG. 6. Further, in the event that the conductors 13 happen to be greater in diameter than a width of the elongated enclosure 18 as defined by the retaining member 44 and the lateral support portion 16, the retaining member 44 is sufficiently flexible so as to permit bending outward to laterally receive the conductors 13 and subsequently bend about a plurality of axes and around the conductors 13 so as to securely enclose them within the elongated enclosure 18.

In various embodiments such as herein described, the flexible closing member 52 serves an additional purpose. Where the closing member 52 is positioned parallel to the lateral support portion 16, a plurality of brackets 10 may be easily and effectively stacked atop each other. As the brackets 10 will ordinarily be distributed in bulk quantities, this feature represents an unique improvement over previous brackets while yet performing beneficial functions with respect to the stated purpose of the bracket 10 generally.

Referring now to FIG. 7, another embodiment of a bracket 11 is shown. In this case, the bracket 11 defines an aperture 18 that fits at least one conductor 13. Also, this embodiment is specifically designed to be mounted on the side surface 30 of the support member 20 or on a wooden stud 20. The bracket 11 has a mounting portion 40 which is positionable to engage the side surface 30 of either a metal or a wooden stud. In this scenario not only does the front edge 22 of the lateral portion 16 provide a self-correcting mechanism in case the bracket 11 is ever twisted or bent forward, the inward facing edge 23 of the lateral portion 16 abutting the side surface 30 of the support member 20 prevents any twisting about the longitudinal axis of the support member 20. Various other features as described in previous embodiments, and as shown in FIG. 7, may be anticipated as supplementing this embodiment as well.

Figure 8:
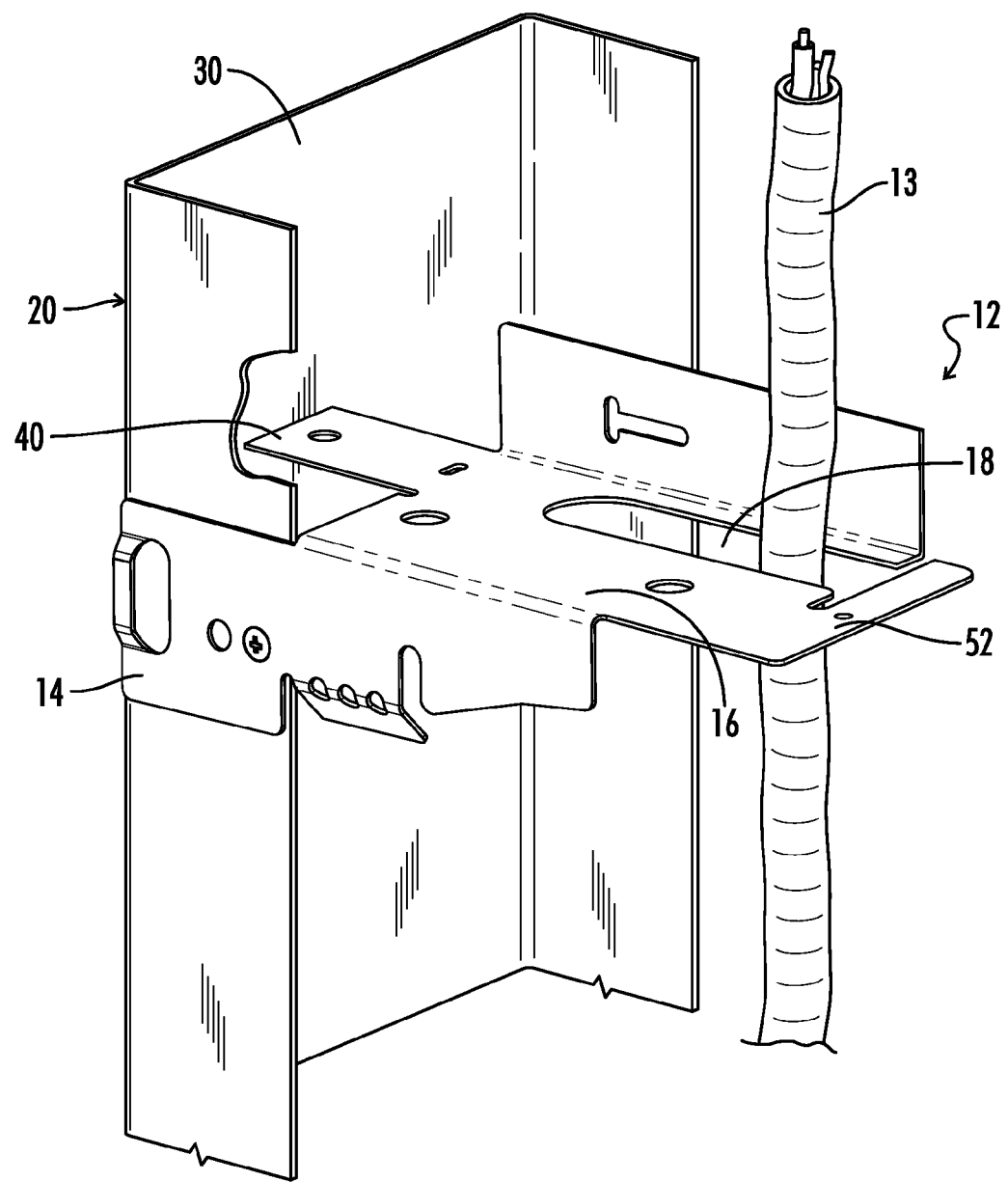
FIG. 8 is a perspective view of yet another embodiment of the present invention having the aperture defined within the lateral support portion.
Figure 9:
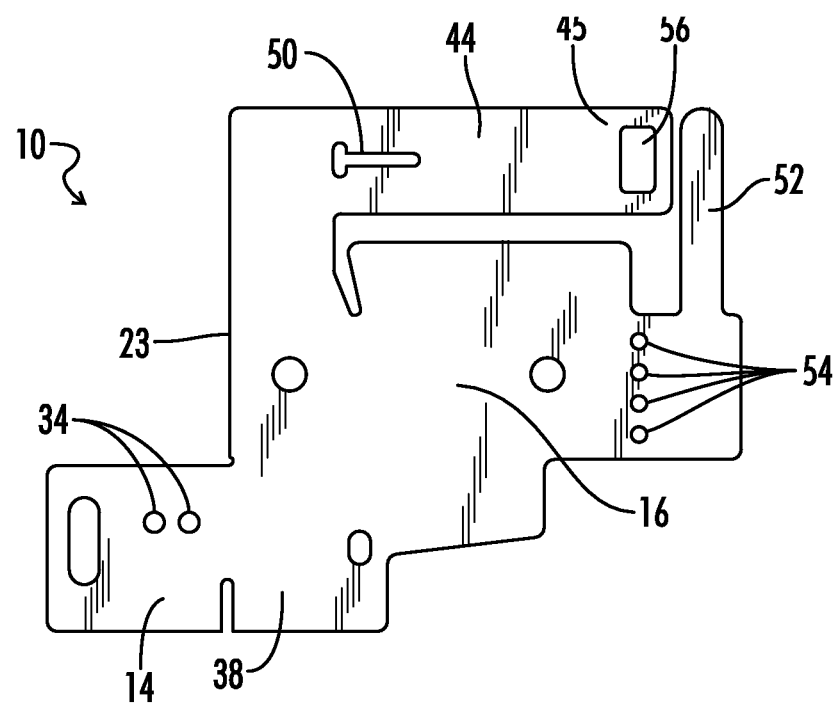
FIG. 9 is a top view of an embodiment for viewing only, with each element not yet flexed from its initial formed position and still parallel to the lateral support portion.

Referring now to FIG. 8, an embodiment of a bracket 12 is shown. In this embodiment, the aperture 18 for the one or more conductors 13 comprises a elongated enclosure 18. The elongated enclosure 18 in this scenario is enclosed by a closing member 52 that is bendable. By bending the tab 52 in an up or down direction, the one or more conductors 13 may be laterally inserted within the elongated enclosure 18. Once the conductors 13 are inserted, the closing member 52 may be bent to close and thereby secure the conductor 13.

This bracket 12 also has a first mounting portion 14 and a second mounting portion 40 to secure the bracket 12 to the support member 20. As explained for the embodiment shown in FIG. 7 above, the mounting portions 14 and 40 can be positioned so that the bracket 12 can be placed on any face of a metal or wooden support member 20. If the bracket 12 is to be mounted on the side surface 30 of the metal support member 20 or on a wooden support member, then the mounting portion 40 can be bent upwards or downwards to engage the required face. Various other features as described in previous embodiments, and as shown in FIG. 8, may be anticipated as supplementing this embodiment as well.

The various embodiments of the above mentioned brackets 10, 11, 12 will generally be integrally formed from a single piece of material such as sheet metal. Particular embodiments of the bracket will be integrally formed from a single sheet of steel. This composition will provide stability in preventing displacement of the brackets 10, 11, 12 in response to external forces. However, it is anticipated that alternative embodiments may utilize separate components to form the brackets 10, 11, 12 of the present invention. In this way, components of the brackets 10, 11, 12 that are intended to be adjustable by the user may be constructed of more flexible material than the other components so as to help maintain rigidity in the overall structure.

The various embodiments of the brackets 10, 11, 12 herein described are designed such that two brackets 10, 11, 12 can be positioned on the same wall stud, such that the third side of one bracket is positioned adjacent to the third side of another bracket of the present invention. This feature applies particularly to wall studs of a standard 3⅝" configuration. However, alternative dimensions are anticipated as desired.

It should be understood that the above mentioned brackets 10, 11, 12 can be used to maintain any type of conductor 13 a fixed distance 24 from the sheet of drywall. For example, MC/AC electrical cable, low voltage cables, fiber optic cables, tubing for liquids or gases, and any other type of electrical conductor 13 can be maintained a fixed distance 24 from a drywall sheet by the above described brackets 10, 11, 12. Such aspects as herein described are merely indicative of the possibilities for the brackets 10, 11, 12 herein described, however, and numerous similar aspects may be regarded as being anticipated.

Thus, although there have been described particular embodiments of a conductor-positioning bracket that prevents drywall screws from piercing electrical wire, it is not intended that such references be construed as limitations upon the scope of this invention except as set forth in the following claims.

What is claimed is:

1. A device for retaining one or more conductors in a substantially fixed position relative to a wall support member, the device further comprising:
    a bracket further comprising
        a substantially planar lateral member having opposing first and third sides and opposing second and fourth sides; and
        a substantially planar mounting member having a first section and a second section, the first section shaped to permit fastening of the mounting member to an attachment surface of the wall support member, the second section attached angularly to the first side of the lateral member wherein a plane of the lateral member extends generally transverse to the support member and generally perpendicular to a longitudinal axis of the support member;
    a retaining member having a first section and a second section, the first section attached to the third side of the lateral member, the retaining member further comprising an aperture proximate a terminal end of the second section, the second section of the retaining member and the lateral member together defining an open-sided enclosure having an edge located at least a fixed distance from a plane of the first section of the mounting member, wherein the retaining member is flexible both inwardly to secure the one or more conductors within the open-sided enclosure at least the fixed distance from the plane of the first section of the mounting member of the bracket, and outwardly to permit the one or more conductors to laterally enter or exit the open-sided enclosure; and
    a closing member further comprising
        a first section attached to the fourth side of the lateral member,
        a second section extending generally across the open-sided of the enclosure, the second section adaptable to interconnect with the terminal end portion of the retaining member wherein the retaining member is restrained from flexing outwardly.

2. The device of claim 1, further comprising a positioning member attached to the lateral member along at least a portion of the open-sided enclosure opposing the retaining member,
    the positioning member extending upward from the lateral member and having a contact portion opposite an attachment to the lateral member,
    the contact portion positioned at least the fixed distance from the plane of the mounting member, such that upon the contact portion engaging the conductors at least the fixed distance between the conductors and the mounting member is maintained.

3. The device of claim 2, wherein the positioning member extends at an angle generally toward the retaining member, and wherein the contact portion further extends upward relative to the positioning member and generally perpendicular to the plane of the lateral member.

4. The device of claim 1, the retaining member further comprising a second aperture in the second section distal the terminal end for facilitating flexibility of the retaining member.

5. The device of claim 1, wherein a plurality of devices are generally stackable upon each other.

6. The device of claim 1, an attachment of the closing member to the lateral member defining an axis about which the closing member is flexible between an orientation perpendicular to the lateral member and parallel to the lateral member.

7. The device of claim 1, wherein the second section of the closing member is further adaptable to engage the aperture proximate the terminal end of the second section of the retaining member and to flexibly interconnect with the retaining member.

8. The device of claim 1, the mounting member further comprising a stabilizing tab attached along a portion of the mounting member parallel to and opposing an attachment of the lateral support member to the mounting member, wherein the stabilizing tab is shaped to engage the wall support member upon fastening of the bracket to the support member.

9. The device of claim 1, the mounting member further comprising a stabilizing tab attached along a portion of the mounting member parallel to and opposing an attachment of the lateral support member to the mounting member, said stabilizing member flexible between at least an orientation parallel to the plane of the mounting member and an orientation angularly inward and toward the lateral member, wherein the stabilizing tab is shaped to engage the wall support member upon fastening of the bracket to the wall support member.

10. The device of claim 1, the mounting member further comprising a user support tab extending outwardly from the plane of the first section of the mounting member relative to the wall support member, the user support tab shaped to hold the bracket in contact with the wall support member in response to a lateral force applied by a user against the user support tab.

11. The device of claim 1, the mounting member further comprising one or more holes shaped to receive fastening means.

12. A device for retaining one or more conductors in a substantially fixed position relative to a wall support member, the device further comprising:
    a bracket further comprising
        a substantially planar lateral member having opposing first and third sides and opposing second and fourth sides; and
        a substantially planar mounting member having a first section and a second section, the first section shaped to permit fastening of the mounting member to an attachment surface of the wall support member, the second section attached angularly to the first side of the lateral member wherein a plane of the lateral member extends generally transverse to the support member and generally perpendicular to a longitudinal axis of the support member;
    a retaining member further comprising
        a first section attached to the third side of the lateral member, and
        a second section having a terminal end, the second section along with the lateral member together defining an open-sided enclosure having an edge located at least a fixed distance from a plane of the first section of the mounting member; and
    a closing member further comprising a first section attached to the fourth side of the lateral member, and a second section extending generally across the open-sided of the enclosure, the second section adaptable to interconnect with the terminal end of the retaining member wherein any conductors within said enclosure are restrained at least the fixed distance from the plane of the first section of the mounting member, and further wherein the retaining member is restrained from flexing outwardly when so interconnected.

13. The device of claim 12, wherein the retaining member is flexible both inwardly to secure the one or more conductors within the open-sided enclosure at least the fixed distance from the plane of the first section of the mounting member of the bracket, and outwardly to permit the one or more conductors to laterally enter or exit the open-sided enclosure.

14. The device of claim 13, the retaining member further comprising an aperture in the second section distal the terminal end for facilitating flexibility of the retaining member.

15. The device of claim 12, further comprising a positioning member attached to the lateral member along at least a portion of the open-sided enclosure opposing the retaining member, the positioning member extending from the lateral member and having a contact portion opposite an attachment to the lateral member, the contact portion positioned at least the fixed distance from the plane of the mounting member, such that upon the contact portion engaging the conductors at least the fixed distance between the conductors and the mounting member is maintained.

16. The device of claim 15, wherein the positioning member extends generally toward the retaining member, and wherein the contact portion further extends angularly relative to the positioning member and generally perpendicular to the plane of the lateral member.

17. The device of claim 12, wherein the closing member is further adaptable to engage an aperture proximate the terminal end of the second section of the retaining member and to flexibly interconnect with the retaining member.

18. The device of claim 12, the mounting member further comprising a stabilizing tab attached along a portion of the mounting member parallel to and opposing an attachment of the lateral support member, wherein the stabilizing tab is shaped to engage the wall support member upon fastening of the bracket to the support member.

19. The device of claim 12, the mounting member further comprising a stabilizing tab flexible between an orientation parallel to the plane of the mounting member and an orientation angularly inward and toward the lateral member, wherein the stabilizing tab is shaped to engage the wall support member upon fastening of the bracket to the wall support member.

20. The device of claim 12, wherein a plurality of devices are generally stackable upon each other.

21. The device of claim 12, an attachment of the closing member to the lateral member defining an axis about which the closing member is flexible between an orientation perpendicular to the lateral member and parallel to the lateral member.

22. The device of claim 12, the mounting member further comprising a stabilizing tab attached along a portion of the mounting member parallel to and opposing an attachment of the lateral support member to the mounting member, wherein the stabilizing tab is shaped to engage the wall support member upon fastening of the bracket to the support member.

23. The device of claim 22, said stabilizing member flexible between at least an orientation parallel to the plane of the mounting member and an orientation angularly inward and toward the lateral member.

24. The device of claim 12, the mounting member further comprising a user support tab extending outwardly from the plane of the first section of the mounting member relative to the wall support member, the user support tab shaped to hold the bracket in contact with the wall support member in response to a lateral force applied by a user against the user support tab.

25. The device of claim 12, the mounting member further comprising one or more holes shaped to receive fastening means.

26. A method of retaining one or more conductors in a substantially fixed position relative to a wall support member using a bracket comprising a substantially planar lateral member having opposing first and third sides and opposing second and fourth sides and a substantially planar mounting member having a first section and a second section, the method further comprising:

fastening the first section of the mounting member to an attachment surface of the wall support member, wherein a plane of the lateral member extends generally transverse to the support member and generally perpendicular to a longitudinal axis of the support member;

flexing outwardly a retaining member attached to the third side of the lateral member, the retaining member having a first section and a second section;

laterally inserting one or more conductors into an open-sided enclosure defined by the lateral member and the second section of the retaining member and having an edge located at least a fixed distance from a plane of the first section of the mounting member;

flexing inwardly the retaining member to a position about the one or more conductors; and interconnecting a terminal end of the retaining member with a portion of a closing member wherein the open-sided of the enclosure is closed and the one or more conductors are retained in a substantially fixed position relative to the wall support member.

* * * * *